(12) United States Patent
Griffin (10) Patent No.: US 7,275,168 B2
(45) Date of Patent: Sep. 25, 2007

(54) SYSTEM AND METHOD FOR PROVIDING CLOCK SIGNALS BASED ON CONTROL SIGNALS FROM FUNCTIONAL UNITS AND ON A HIBERNATE SIGNAL

(75) Inventor: Daniel J. Griffin, Ft. Collins, CO (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 597 days.

(21) Appl. No.: 10/784,859

(22) Filed: Feb. 23, 2004

(65) Prior Publication Data

US 2005/0188236 A1  Aug. 25, 2005

(51) Int. Cl.
*G06F 1/32* (2006.01)
(52) U.S. Cl. .................... 713/324; 713/600
(58) Field of Classification Search ........... 713/324, 713/600
See application file for complete search history.

(56) References Cited

U.S. PATENT DOCUMENTS

| | | | |
|---|---|---|---|
| 6,079,022 A | 6/2000 | Young | |
| RE36,839 E | * 8/2000 | Simmons et al. | 326/93 |
| 6,247,134 B1 | 6/2001 | Sproch et al. | |
| 6,301,671 B1 | 10/2001 | Boice et al. | |
| 6,587,952 B2 | 7/2003 | Lin | |
| 6,600,575 B1 | 7/2003 | Kohara | |
| 6,963,060 B2 * | 11/2005 | Knee et al. | 250/208.1 |

* cited by examiner

*Primary Examiner*—Chun Cao
*Assistant Examiner*—Albert Wang (57) ABSTRACT

A system comprising a clock control module, a first functional unit, and a second functional unit is provided. The clock control module is configured to provide a first clock signal having a first frequency to the first functional unit in response to receiving a start signal. The clock control module is configured to provide the first clock signal to the second functional unit in response to receiving a first control signal from the first functional unit, and the clock control module is configured to stop providing the first clock signal to the first functional unit in response to receiving the first control signal from the first functional unit.

21 Claims, 6 Drawing Sheets

SYSTEM AND METHOD FOR PROVIDING CLOCK SIGNALS BASED ON CONTROL SIGNALS FROM FUNCTIONAL UNITS AND ON A HIBERNATE SIGNAL

BACKGROUND

As devices that include digital systems become increasingly portable, the power consumption of a device becomes a greater priority for the designers of the device. Portable devices typically operate using a rechargeable or replaceable power source, such as batteries. Designers of portable devices typically seek to maximize the amount of time that the power source will provide adequate power to the device. By doing so, the amount of time that a device may be operated by a user before the power source needs to be recharged or replaced may be increased. Designers of portable devices typically also seek to improve the performance of the devices. Unfortunately, performance increases may add to the size or complexity of a digital system in a portable device.

Digital systems generally operate using one or more clock signals that are generated by one or more clocks in the system. The clock signals allow digital circuits a system to perform operations in an orderly and synchronized manner. As the components that make up a digital system becomes faster, the system may become operable with clock signals that have higher frequencies. These higher frequencies may cause an increase in the performance of the system. Unfortunately, the amount of power that is consumed by the system typically increases with an increase in the frequency of a clock signal.

It would be desirable to be able to provide clock signals in a digital system in a way that both maximizes the performance of the system and minimizes power consumption by the system.

SUMMARY

In an exemplary embodiment, the present disclosure provides a system comprising a clock control module, a first functional unit, and a second functional unit. The clock control module is configured to provide a first clock signal having a first frequency to the first functional unit in response to receiving a start signal. The clock control module is configured to provide the first clock signal to the second functional unit in response to receiving a first control signal from the first functional unit, and the clock control module is configured to stop providing the first clock signal to the first functional unit in response to receiving the first control signal from the first functional unit.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
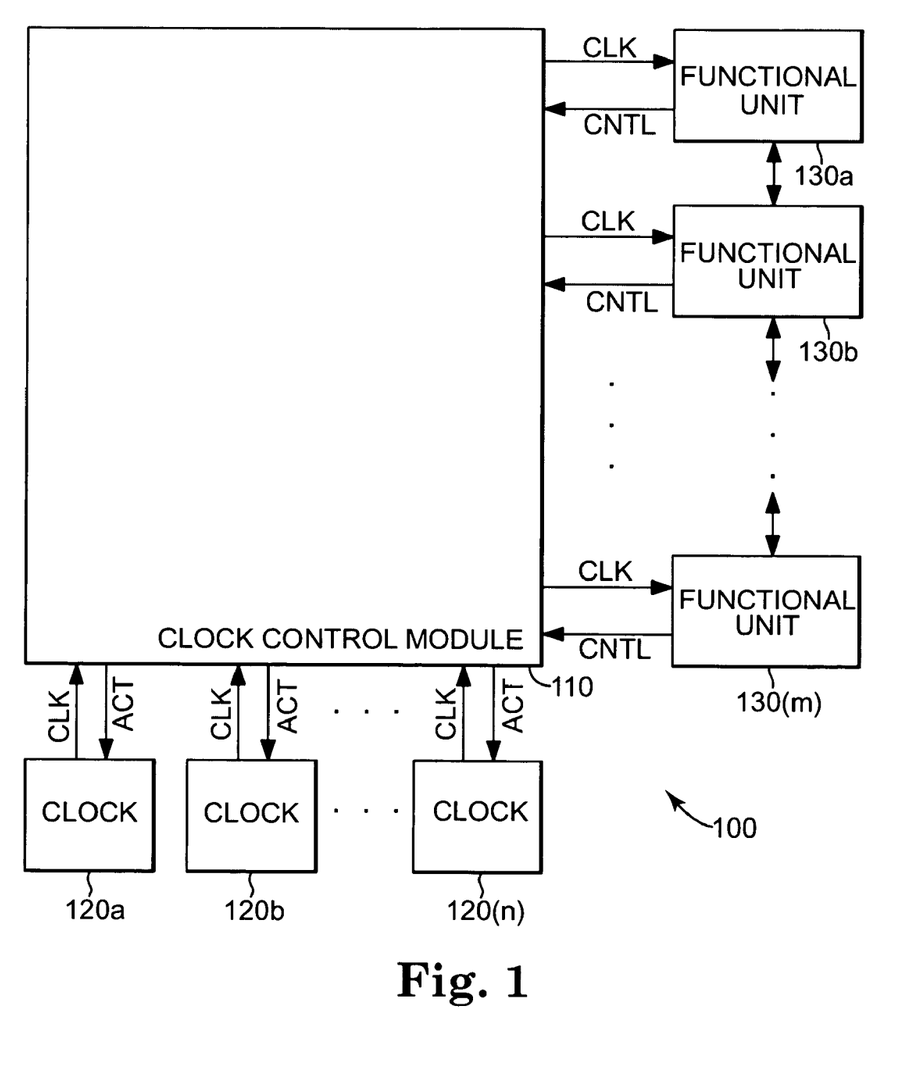
FIG. 1 is a block diagram illustrating an embodiment of a digital system.

FIG. 1 is a block diagram illustrating an embodiment of a digital system 100. Digital system 100 comprises a clock control module 110 coupled to a plurality of clocks 120a through 120(n), where n represents the nth clock 120 and is greater than or equal to one, and a plurality of functional units 130a through 130(m), where m represents the mth functional unit 130 and is greater than one. Each clock 120 provides a clock signal "CLK" to clock control module 110 and receives an activate signal "ACT" from clock control module 110. Each functional unit 130 receives a clock signal "CLK" from clock control module 110 and provides a control signal "CNTL" to clock control module 110.

Clock control module 110 provides an activate signal to each clock 120 and receives a clock signals from each clock 120 in response to providing the activate signal. Clock control module 110 also provides a clock signal to each functional unit 130. Clock control module 110 stops providing a clock signal to a functional unit 130 in response to receiving a control signal from that functional unit 130. Clock control module 110 may provide a clock signal to another functional unit 130 in response to receiving the control signal from the functional unit 130.

Each clock 120 is configured to provide a clock signal at a particular frequency in response to an activate signal from clock control module 110. Clocks 120 may all be generated from a single oscillator using digital circuitry or each clock 120 may be generated from separate oscillators. Each clock 120 is generated in response to receiving the activate signal from clock control module 110.

Each functional unit 130 comprises a digital circuit configured to perform one or more functions in response to receiving a clock signal from clock control circuit 110. After a functional unit 130 completes one or more functions, the functional unit 130 provides a control signal to clock control module 110 to cause clock control module 110 to stop providing the clock signal. Each functional unit 130 is configured to communicate with one or more functional units 130.

In operation, clock control module 110 provides selected clock signals to functional units 130 at various times in an effort to reduce the amount of power consumed by digital system 100. In one embodiment, clock control module 110 causes functional units 130 to perform an operation in a serial processing format. In this embodiment, clock control module 110 provides a selected clock signal to each functional unit 130 in turn to cause information to be processed serially by functional units 130. For example, in response to receiving a signal to begin an operation (referred to herein as a "start signal"), clock control module 110 provides a selected clock signal from a clock 120 to a first functional unit, e.g., functional unit 130a. In response to receiving the clock signal, functional unit 130a performs its function to generate first information, provides the first information to a next functional unit, e.g., functional unit 130b, and provides a control signal to clock control module 110. In response to the control signal, clock control module 110 stops providing the clock signal to functional unit 130a and provides a selected clock signal to functional unit 130b. The clock signal provided to functional unit 130b may have the same or a different frequency than the clock signal provided to functional unit 130a.

In response to receiving the clock signal, functional unit 130b performs its function to generate second information, provides the second information to a next functional unit, e.g., functional unit 130c (not shown), and provides a control signal to clock control module 110. In response to the control signal, clock control module 110 stops providing the clock signal to functional unit 130b and provides a selected clock signal to functional unit 130c.

The process of providing clock signals to individual functional units 130 to allow individual functions to be performed continues until a final functional unit 130, e.g., functional unit 130(m), completes its function by generating the final information associated with the operation. In response to receiving the control signal from the final functional unit 130, clock control module 110 stops providing the clock signal to the final functional unit 130.

In response to a control signal, clock control module 110 may provide a clock to a next functional unit 130 for a set period of time before it stops providing a clock signal to the function unit 130 that generated the control signal.

Clock control module 110 may select a clock signal from a clock 120 to provide to a functional unit 130 based on the relative processing speed of the functional unit 130 or on a desired performance level for digital system 100. For example, clock control module 110 may provide clock signals with different frequencies to different functional units 130 at various times. Clock control module 110 may also provide a first clock signal to each function unit 130 to achieve a first level of performance and may provide a second clock signal to each function unit 130 to achieve a second level of performance.

Between performing operations, clock control module 110 may receive a hibernate signal from digital system 100. In response to the hibernate signal, clock control module 110 stops providing the clock signal to functional unit provides a relatively low frequency clock signal to one or more of functional units 130 to cause digital system 100 to operate in a hibernate mode. Digital system 100 may generate a start signal and provide the start signal to clock control module 110 to initiate an operation and cause digital system 100 to operate in a run mode. A control circuit (not shown) in digital system 100 may generate the start signal and the hibernate signal.

Clock control circuit 110, clocks 120, and functional units 130 may each comprise any combination of hardware and software components configured to perform the functions described above.

Figure 2:
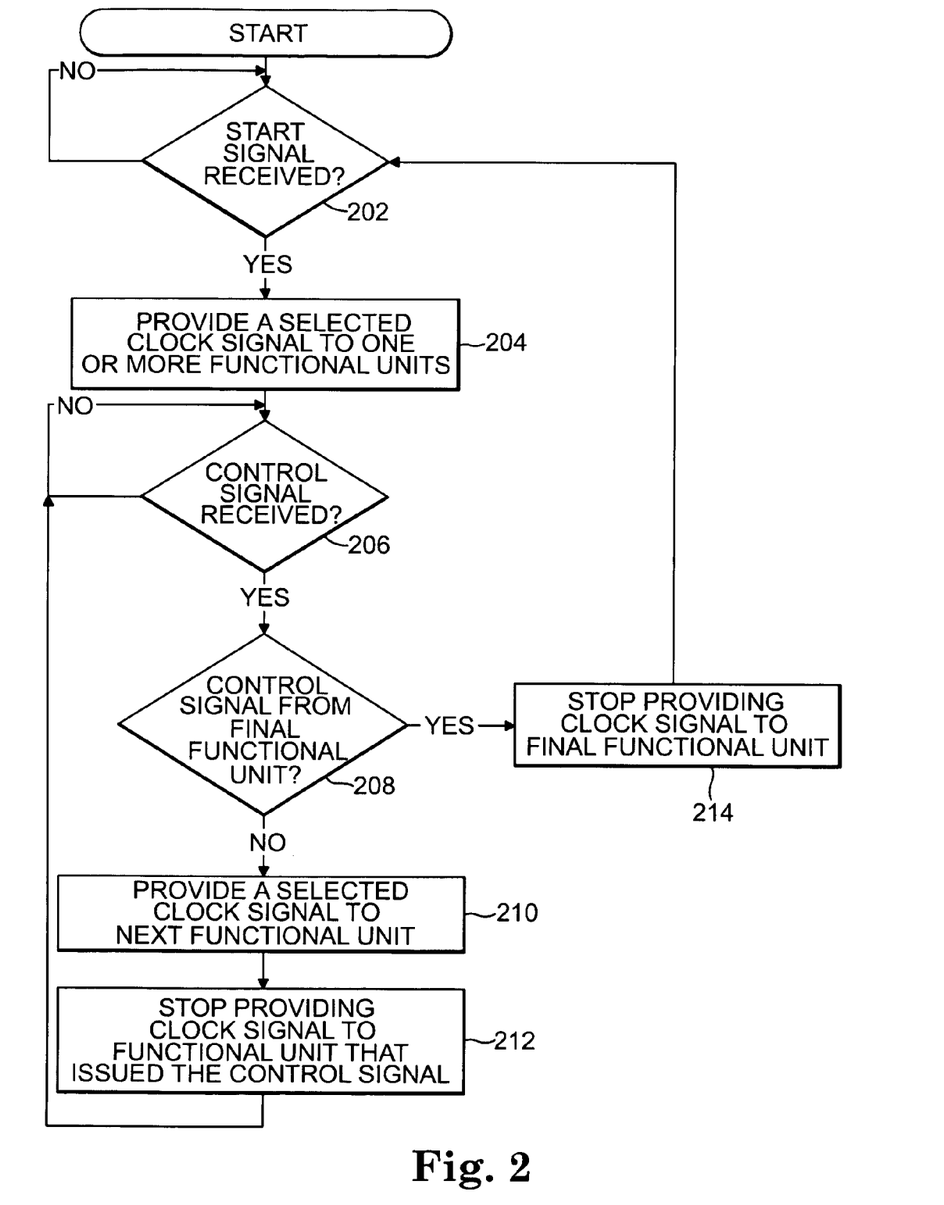
FIG. 2 is a flow chart illustrating an embodiment of a method for providing clock signals in the digital system shown in FIG. 1.

FIG. 2 is a flow chart illustrating an embodiment of a method for providing clock signals in digital system 100. In FIG. 2, a determination is made by clock control module 110 as to whether a start signal has been received as indicated in block 202. The start signal may cause a serial processing operation to be perform in digital system 100 using functional units 130 as described above. If a start signal has not been received, then the function of block 202 is periodically repeated. If start signal has been received then clock control module 110 provides a selected clock signal from a selected clock 120 to one or more functional units 130 as indicated in a block 204.

A determination is made by clock control module 110 as to whether a control signal has been received as indicated in block 206. If a control signal has not been received, then the function of block 206 is periodically repeated. If a control signal has been received, then a determination is made by clock control module 110 as to whether the control signal is from the final function unit 130 as indicated in a block 208. If the control signal is not from the final function unit 130, then clock control module 110 provides a selected clock signal from a selected clock 120 to the next functional unit as indicated in a block 210. Clock control module 110 stops providing a clock signal to the functional unit 130 that issued the control signal as indicated in a block 212. Clock control module 110 then repeats the function of block 202 at a later time.

If the control signal is from the final function unit 130, then clock control module 110 stops providing a clock signal to the final function unit as indicated in a block 214 and repeats the function of block 202 at a later time.

Figure 3:
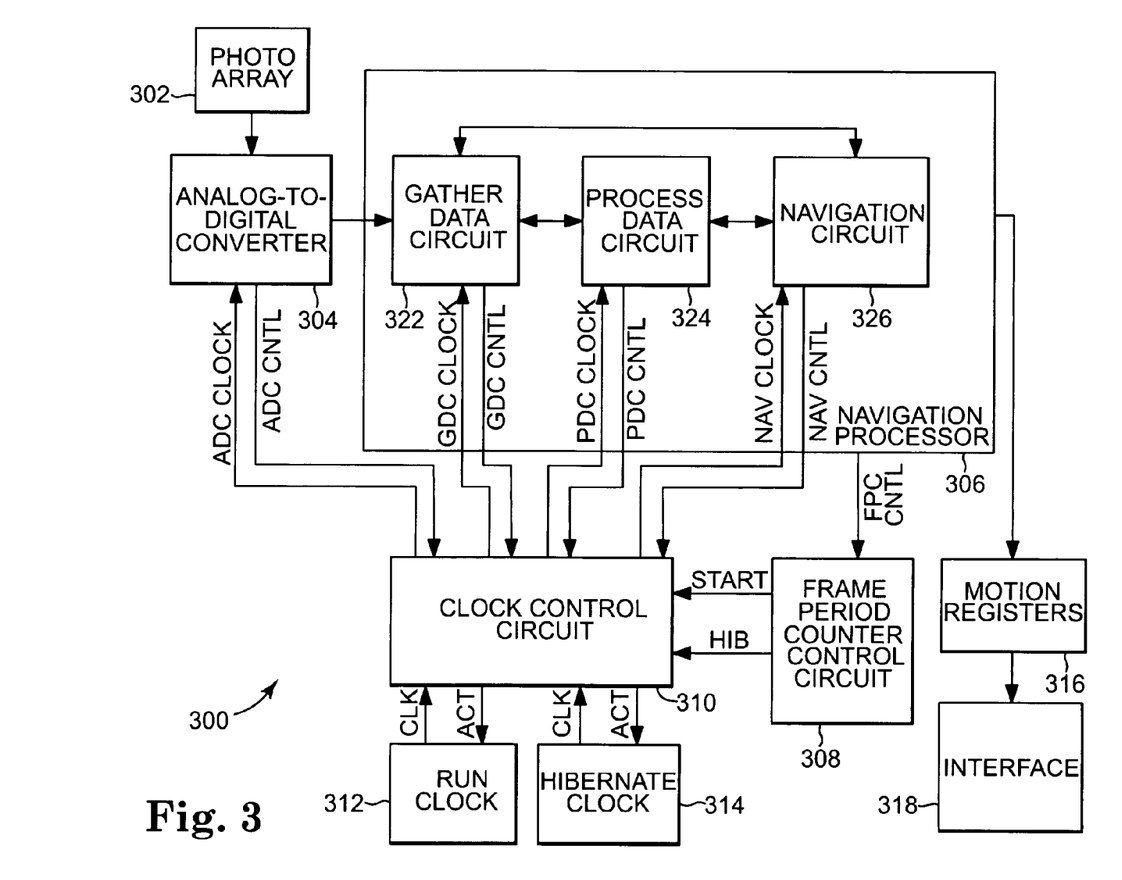
FIG. 3 is a block diagram illustrating an embodiment of a navigation sensor.

FIG. 3 is a block diagram illustrating an embodiment of a navigation sensor 300. Navigation sensor 300 comprises a photo array 302, an analog-to-digital converter (ADC) 304, a navigation processor 306, a frame period counter control circuit 308, a clock control circuit 310, a run clock 312, a hibernate clock 314, a set of motion registers 316, and an interface 318. Navigation processor 306 comprises a gather data circuit (GDC) 322, a process data circuit (PDC) 324, and a navigation circuit 326. In other embodiments, navigation processor 306 may include other types and numbers of functional units that may each receive a clock signal from and provide a control signal to clock control circuit 310.

Photo array 302 comprises an array of photo-receptive elements configured to capture a frame in an analog format in response to the elements being exposed to a light source. Photo array 302 provides the analog frame information to ADC 304.

ADC 304 receives the analog frame information from photo array 302 and converts the analog frame information to a digital format. ADC provides the digital frame information to GDC 322 in navigation processor 306.

GDC 322 receives and stores the digital frame information. GDC 322 provides the digital frame information to PDC 324. PDC 324 processes the digital frame information by performing a matrix multiply on the digital frame information using one or more coefficients and by correlating the digital frame information with previous digital frame information from previous frame exposed by photo array 302 to generate processed frame information. PDC 324 provides processed frame information to navigation circuit 326.

Navigation circuit 326 receives the processed frame information from PDC 324 and examines the processed frame information to generate position information. Navigation circuit 326 stores the position information in motion registers 316. In one embodiment, position information comprises a x-position value that is stored in an x-position register in motion registers 316 and a y-position value that is stored in a y-position register in motion registers 316. In other embodiments, position information may comprise other information that is stored in other numbers of registers in motion registers 316.

Interface 318 provides access to the position information in motion registers 316 to a transceiver (shown in FIG. 6) or other device or circuit. In one embodiment, interface 318 comprises an SPI interface. In other embodiments, interface 318 may comprise other types of interfaces.

Navigation processor 306 generates frame period counter (FPC) control signals "FPC CNTL" and provides the FPC control signals to FPC control circuit 308. In one embodiment, navigation circuit 326 generates the FPC control signals and provides the signal to FPC control circuit 308. In other embodiments, the FPC control signals may be generated by other circuits in navigation processor 306. Navigation processor 306 generates the FPC control signals to cause navigation sensor 300 to either perform a frame capture operation in a run mode or enter a hibernate mode.

In response to receiving the FPC control signals, FPC control circuit 308 generates either a start signal "START" or a hibernate signal "HIB" according to the FPC control signals and provides the signal to clock control circuit 310.

Clock control circuit 310 receives the start and hibernate signals from FPC control circuit 308. In response to receiving the start signal, clock control circuit 310 provides an activate signal "ACT" to run clock 312 to cause a run clock signal having a run frequency to be generated and provided to clock control circuit 310. In response to receiving the hibernate signal, clock control circuit 310 provides an activate signal "ACT" to hibernate clock 314 to cause a hibernate clock signal having a hibernate frequency to be generated and provided to clock control circuit 310. Run clock 312 and hibernate clock 314 may be generated from a single oscillator using digital circuitry or may be generated from separate oscillators. The run clock signal has a frequency that is greater than the hibernate clock signal.

Clock control circuit 310 distributes either the run clock signal or the hibernate clock signal to navigation sensor 300. In particular, clock control circuit 310 provides an ADC clock signal "ADC CLOCK" to ADC 304, a GDC clock signal "GDC CLOCK" to GDC 322, a PDC clock signal "PDC CLOCK" to PDC 324, and a navigation clock signal "NAV CLOCK" to navigation circuit 326.

ADC 304 generates an ADC control signal "ADC CNTL" and provides the ADC control signal to clock control circuit 310. GDC 322 generates a GDC control signal "GDC CNTL" and provides the GDC control signal to clock control circuit 310. PDC 324 generates a PDC control signal "PDC CNTL" and provides the PDC control signal to clock control circuit 310. Navigation circuit 326 generates a navigation control signal "NAV CNTL" and provides the navigation control signal to clock control circuit 310.

Clock control circuit 310 receives the control signals from ADC 304, GDC 322, PDC 324, and navigation circuit 326 to cause clock signals to be provided and stop being provided to appropriate functional units. Additional details of providing clock signals in response to start, hibernate, and control signals in navigation sensor 300 will now be described with reference to FIGS. 4 and 5.

Figure 4:
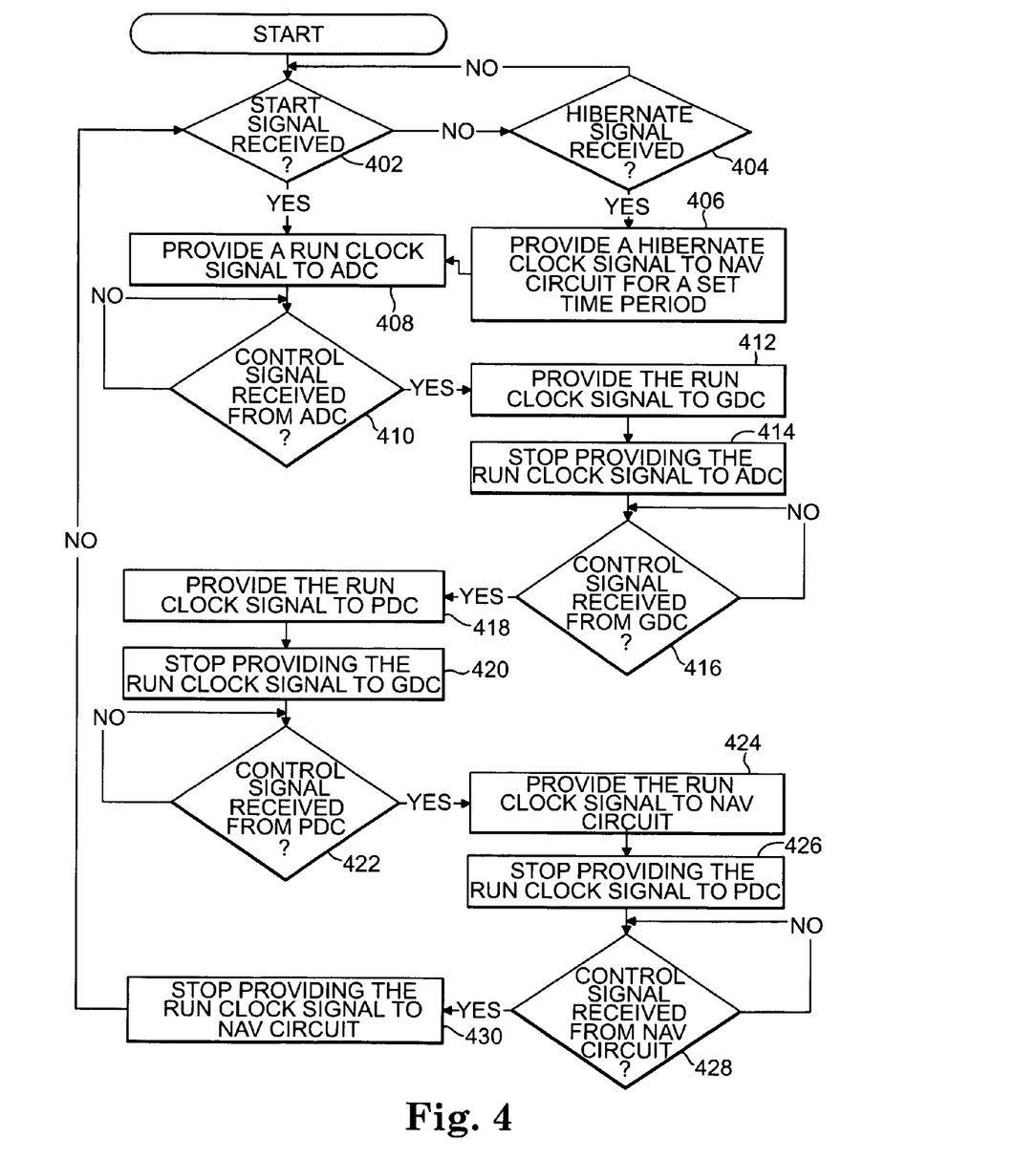
FIG. 4 is a flow chart illustrating an embodiment of a method for providing clock signals in the navigation sensor shown in FIG. 3.

FIG. 4 is a flow chart illustrating an embodiment of a method for providing clock signals in navigation sensor 300. In FIG. 4, a determination is made by clock control circuit 310 as to whether a start signal has been received from FPC control circuit 308 as indicated in a block 402. If a start signal has been received, then clock control circuit 310 initiates a frame capture operation which is embodied by the functions of blocks 408 through 430 as described below. If a start signal has not been received, then a determination is made by clock control circuit 310 as to whether a hibernate signal has been received from FPC control circuit 308 as indicated in a block 404. If a hibernate signal has not been received, then the functions of blocks 402 and 404 are periodically repeated.

If a hibernate signal has been received, then the hibernate clock signal from hibernate clock 314 is provided to navigation circuit 326 using the NAV CLOCK signal for a set time period as indicated in a block 406. After the set time period expires, clock control circuit 310 initiates the frame capture operation embodied by the functions of blocks 408 through 430 which will now be described.

Clock control circuit 310 provides the run clock signal from run clock 312 to ADC 304 as indicated in a block 408. A determination is made by clock control circuit 310 as to whether a control signal has been received from ADC 304 as indicated in a block 410. The determination of block 410 is made periodically until the control signal is received from ADC 304. In response to the control signal from ADC 304 being received by clock control circuit 310, clock control circuit 310 provides the run clock signal from run clock 312 to GDC 322 as indicated in a block 412. Clock control circuit 310 stops providing the run clock signal to ADC 304 as indicated in a block 414.

A determination is made by clock control circuit 310 as to whether a control signal has been received from GDC 322 as indicated in a block 416. The determination of block 416 is made periodically until the control signal is received from GDC 322. In response to the control signal from GDC 322 being received by clock control circuit 310, clock control circuit 310 provides the run clock signal from run clock 312 to PDC 324 as indicated in a block 418. Clock control circuit 310 stops providing the run clock signal to GDC 322 as indicated in a block 420.

A determination is made by clock control circuit 310 as to whether a control signal has been received from PDC 324 as indicated in a block 422. The determination of block 422 is made periodically until the control signal is received from PDC 324. In response to the control signal from PDC 324 being received by clock control circuit 310, clock control circuit 310 provides the run clock signal from run clock 312 to navigation circuit 326 as indicated in a block 424. Clock control circuit 310 stops providing the run clock signal to PDC 324 as indicated in a block 426.

A determination is made by clock control circuit 310 as to whether a control signal has been received from navigation circuit 326 as indicated in a block 428. The determination of block 428 is made periodically until the control signal is received from navigation circuit 326. In response to the control signal from navigation circuit 326 being received by clock control circuit 310, clock control circuit 310 stops providing the run clock signal to navigation circuit 326 as indicated in a block 430. Clock control circuit 310 then repeats the functions shown in blocks 402 and 404 until either a start or a hibernate signal is received from frame period counter control circuit 308.

Figure 5:
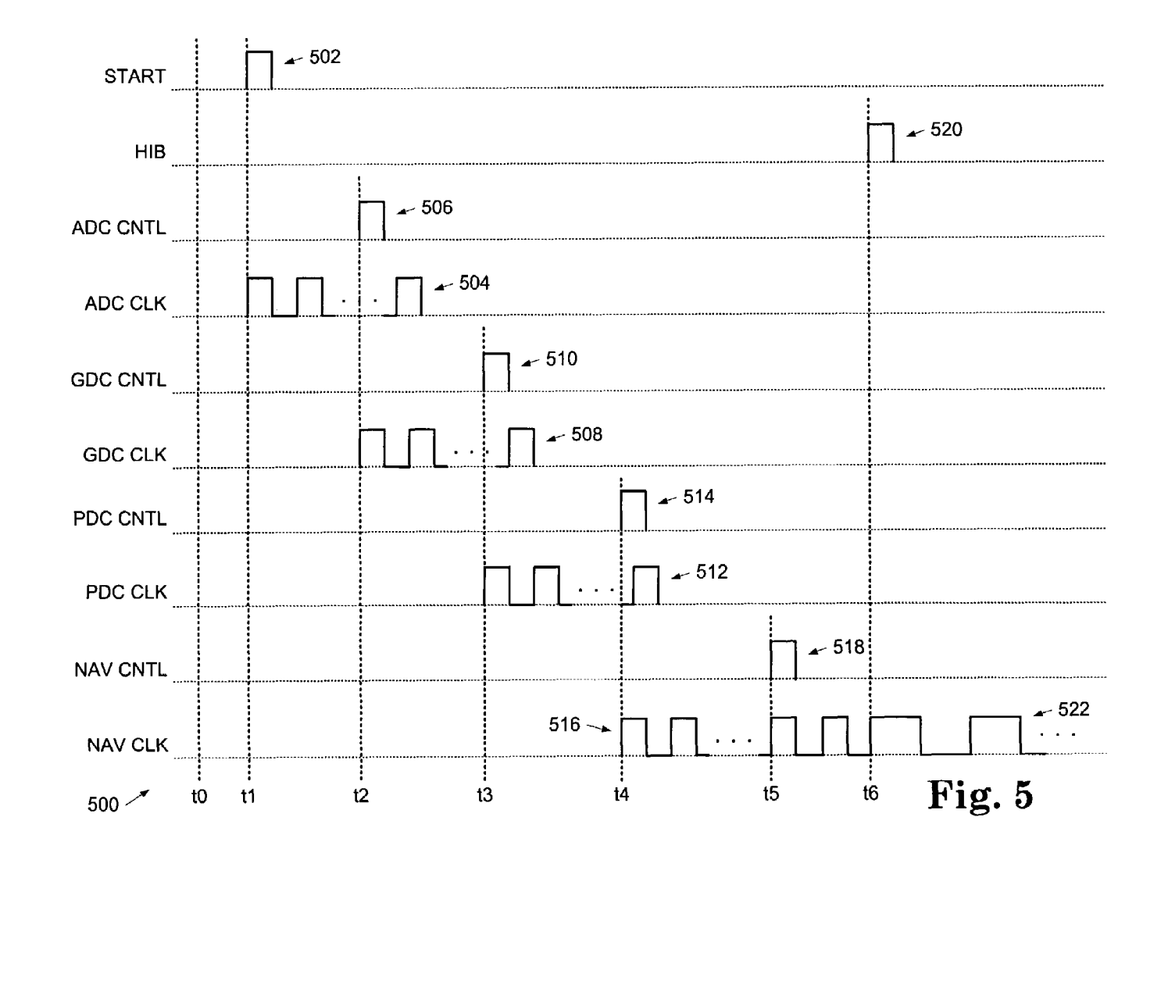
FIG. 5 is a timing diagram illustrating an embodiment of providing clock signals in the navigation sensor shown in FIG. 3.

FIG. 5 is a timing diagram 500 illustrating an embodiment of providing clock signals in the navigation sensor shown in FIG. 3. Timing diagram 500 illustrates the timing of the start and hibernate signals generated by FPC control circuit 308, the ADC clock, the GDC clock, PDC clock, and the navigation clock signals provided by clock control circuit 310, and the ADC control, the GDC control, PDC control, and the navigation control signals generated by ADC 304, GDC circuit 324, PDC circuit 324, and navigation circuit 326, respectively.

In FIG. 5, a start signal 502 is provided to clock control circuit 310 at time t1 to initiate a frame capture operation. In response to the start signal, clock control circuit 310 provides the run clock signal to ADC 304 as indicated by the ADC CLK signal 504. In response to receiving the clock signal, ADC 304 receives the analog frame information from photo array 302 and converts the analog frame information to a digital format.

At time t2, ADC 304 generates an ADC control signal 506 and provides the ADC control signal to clock control circuit 310. In response to the ADC control signal, clock control circuit 310 provides the run clock signal to GDC 322 as indicated by the GDC CLK signal 508. Subsequent to time t2, ADC 304 provides the digital frame information to GDC 322, and GDC 322 receives and stores the digital frame information. Clock control circuit 310 stops providing the run clock to ADC 304 at some point after ADC 304 provides the digital frame information to GDC 322.

At time t3, GDC 322 generates a GDC control signal 510 and provides the GDC control signal to clock control circuit 310. In response to the GDC control signal, clock control circuit 310 provides the run clock signal to PDC 324 as indicated by the PDC CLK signal 512. Subsequent to time t3, GDC 322 provides the digital frame information to PDC 324, and PDC 324 processes the digital frame information to generate processed frame information. Clock control circuit 310 stops providing the run clock to GDC 322 at some point after GDC 322 provides the digital frame information to PDC 324.

At time t4, PDC 324 generates a PDC control signal 514 and provides the PDC control signal to clock control circuit 310. In response to the PDC control signal, clock control circuit 310 provides the run clock signal to navigation circuit 326 as indicated by the NAV CLK signal 516. Subsequent to time t4, PDC 324 provides the processed frame information to navigation circuit 326, and navigation circuit 326 examines the processed frame information to generate position information and stores the position information in motion registers 316. Clock control circuit 310 stops providing the run clock to PDC 324 at some point after PDC 324 provides the processed frame information to navigation circuit 326.

At time t5, navigation circuit 326 generates a navigation control signal 518 and provides the navigation control signal to clock control circuit 310. In response to the navigation control signal, clock control circuit 310 stops providing the run clock to navigation circuit 326 at some point after navigation circuit 326 provides the position information to motion registers 316.

At time t6, a hibernate signal 520 is provided to clock control circuit 310 to initiate the hibernation mode. In response to the hibernate signal, clock control circuit 310 provides the hibernate clock signal to navigation circuit 326 as indicated by the NAV CLK signal 522.

In one embodiment, clock control circuit 310 provides the hibernate clock signal to navigation circuit 326 for a defined time period and then initiates a frame capture operation. In other embodiments, clock control circuit 310 provides the hibernate clock signal to navigation circuit 326 until a start signal is received from FPC control circuit 308 in response to a FPC control signal from navigation processor 306.

Figure 6:
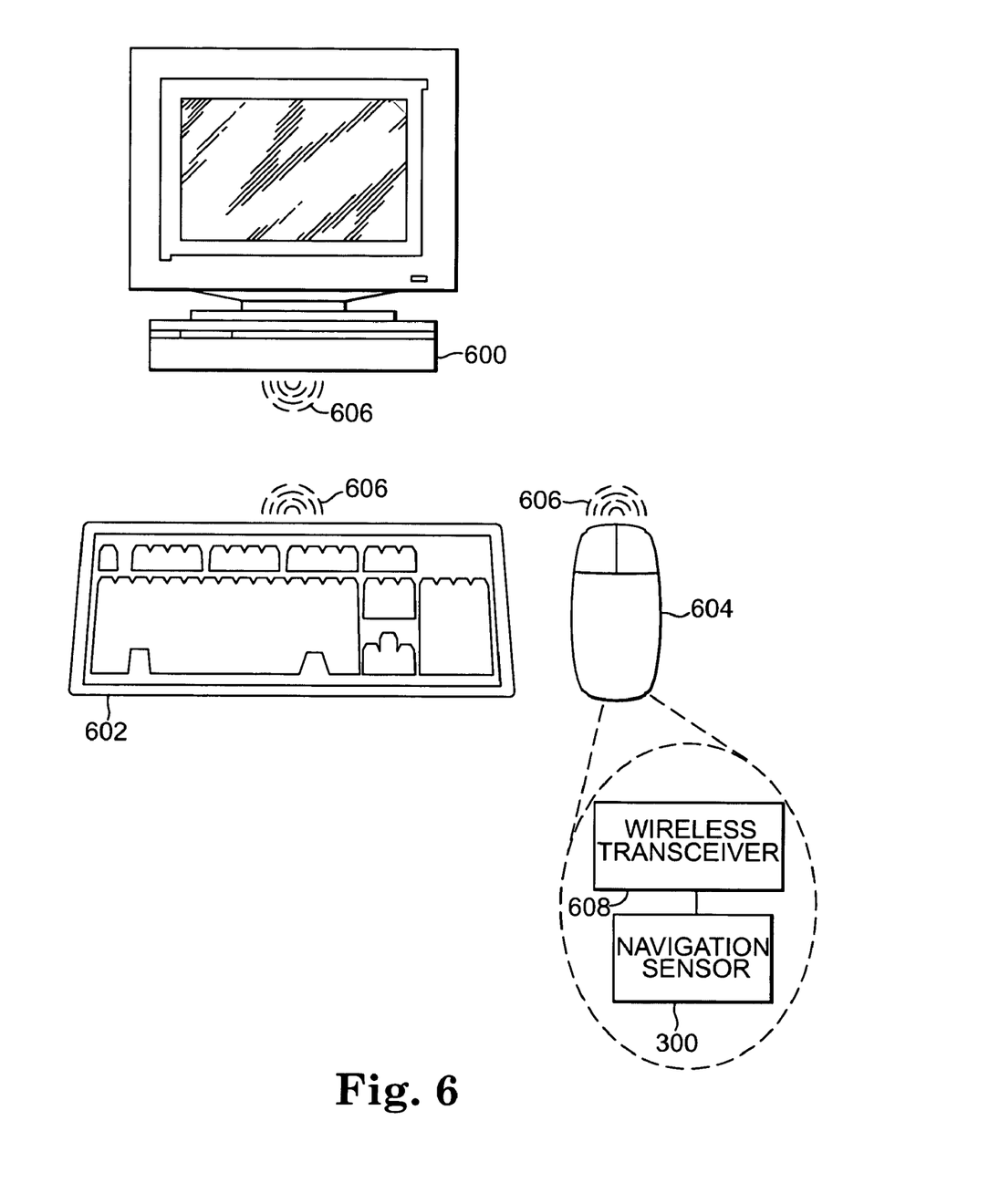
FIG. 6 is a diagram illustrating an embodiment of a computer system with a wireless keyboard and a wireless mouse that includes the navigation sensor shown in FIG. 3.

FIG. 6 is a diagram illustrating an embodiment of a computer system 600 with a wireless keyboard 602 and a wireless mouse 604 that comprises a wireless transceiver 608 and navigation sensor 300 shown in FIG. 3. Wireless keyboard 602 and wireless mouse 604 are configured to provide input signals to computer system 600 using a wireless connection 606. Wireless keyboard 602 and wireless mouse 604 may also be configured to receive output signals from computer system 600 using wireless connection 606.

In wireless mouse 604, navigation sensor 300 generates position information as described above and provides the position information to wireless transceiver 608. Wireless transceiver 608 receives the position information from wireless mouse 604 and provides the position information to computer system 600 using wireless connection 606. Computer system 600 receives the position information from wireless mouse 604 using wireless connection 606 and may provide other information to wireless transceiver 608 using wireless connection 606.

Computer system 600 may be any type of processing system configured to be operated using wireless mouse 604. Examples of such a computer system include a desktop, a laptop, a server, a workstation, a television set-top box, a personal digital assistant (PDA), a mobile telephone, an audio device, and a video device. Other types of computer systems are possible and contemplated.

In addition to wireless mouse 604, navigation sensor 604 may be included in other types of navigation devices including other types of input/output devices.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
   a clock control module;
   a first functional unit; and a second functional unit; wherein the clock control module is configured to provide a first clock signal having a first frequency to the first functional unit in response to receiving a start signal, and the clock control module is configured to provide the first clock signal to the second functional unit in response to receiving a first control signal from the first functional unit, and wherein the clock control module is configured to stop providing the first clock signal to the first functional unit in response to receiving the first control signal from the first functional unit; and
   a control circuit configured to provide a hibernate signal to the clock control module.

2. The system of claim 1 further comprising:
   a third functional unit; wherein the clock control module is configured to provide the first clock signal to the third functional unit in response to receiving a second control signal from the second functional unit, and wherein the clock control module is configured to stop providing the first clock signal to the second functional unit in response to receiving the second control signal from the second functional unit.

3. The system of claim 1 further comprising: a third functional unit; wherein the clock control module is configured to provide a second clock signal having a second frequency to the third functional unit in response to receiving a second control signal from the second functional unit, wherein the first frequency differs from the second frequency, and wherein the clock control module is configured to stop providing the first clock signal to the second functional unit in response to receiving the second control signal from the second functional unit.

4. The system of claim 1 wherein the clock control module is configured to stop providing the first clock signal to the second functional unit in response to receiving a second control signal from the second functional unit.

5. The system of claim 4 wherein the clock control module is configured to provide a second clock signal having a second frequency to the second functional unit subsequent to receiving the second control signal and in response to receiving the hibernate signal, and wherein the first frequency is greater than the second frequency.

6. The system of claim 5 further comprising:
a first clock configured to provide the first clock signal; and
a second clock configured to provide the second clock signal.

7. A system comprising:
a photo array;
an analog-to-digital converter coupled to the photo array;
a processor coupled to the analog-to-digital converter;
a clock control circuit coupled to the analog-to-digital converter and the processor; wherein the clock control circuit is configured to provide a first clock signal having a first frequency to the analog-to-digital converter in response to receiving a start signal, wherein the clock control circuit is configured to provide the first clock signal to the processor in response to receiving a first control signal from the analog-to-digital converter, and wherein the clock control circuit is configured to stop providing the first clock signal to the analog-to-digital converter in response to receiving the first control signal from the analog-to-digital converter; and
a control circuit configured to provide a hibernate signal to the clock control circuit.

8. The system of claim 7 wherein the clock control circuit is configured to stop providing the first clock signal to the processor in response to receiving the second control signal from the processor, wherein the clock control circuit is configured to provide a second clock signal having a second frequency to the processor in response to receiving the hibernate signal, and wherein the first frequency is greater than the second frequency.

9. The system of claim 8 further comprising:
a control circuit coupled to the processor and the clock control circuit; wherein the control circuit is configured to generate the start signal in response to receiving a third control signal from the processor, wherein the control circuit is configured to provide the start signal to the clock control circuit, and wherein the control circuit is configured to generate the hibernate signal in response to receiving a fourth control signal from the processor.

10. The system of claim 9 wherein the processor comprises:
a first circuit configured to receive digital frame information from the analog-to-digital converter; a second circuit configured to process the digital frame information; and a navigation circuit configured to generate the third and fourth control signals; wherein the clock control circuit is configured to provide the first clock signal to the first circuit in response to receiving the first control signal from the analog-to-digital converter, wherein the clock control circuit is configured to provide the first clock signal to the second circuit in response to receiving a fifth control signal from the first circuit, wherein the clock control circuit is configured to stop providing the first clock signal to the first circuit in response to receiving the fifth control signal from the first circuit, wherein the clock control circuit is configured to provide the first clock signal to the navigation circuit in response to receiving a sixth control signal from the second circuit, wherein the clock control circuit is configured to stop providing the first clock signal to the second circuit in response to receiving the sixth control signal from the second circuit, and wherein the clock control circuit is configured to stop providing the first clock signal to the navigation circuit in response to receiving a seventh control signal from the navigation circuit.

11. The system of claim 10 wherein the control circuit is configured to generate the hibernate signal in response to receiving the fourth control signal from the navigation circuit, and wherein the clock control circuit is configured to provide the second clock signal to the navigation circuit in response to receiving the hibernate signal.

12. The system of claim 8 further comprising:
a first clock coupled to the clock control circuit; and
a second clock coupled to the clock control circuit; wherein the first clock configured to provide the first clock signal to the clock control circuit, and wherein the second clock configured to provide the second clock signal to the clock control circuit.

13. The system of claim 7 further comprising:
a motion register coupled to the processor; wherein the processor is configured to store first information in the motion register, and wherein the first information is associated with second information generated by the photo array.

14. A method comprising:
providing a first clock signal having a first frequency to a first functional unit; receiving a first control signal from the first functional unit subsequent to providing the first clock signal to the first functional unit;
providing the first clock signal to a second functional unit in response to receiving the first control signal;
not providing the first clock signal to the first functional unit in response to receiving the first control signal; and
receiving a hibernate signal.

15. The method of claim 14 further comprising:
receiving a start signal; and
providing the first clock signal to the first functional unit in response to receiving the start signal.

16. The method of claim 14 further comprising:
not providing the first clock signal to the second functional unit in response to receiving a second control signal from the second functional unit; and
providing a second clock signal having a second frequency that is less than the first frequency to the second functional unit subsequent to not providing the first clock signal to the second functional unit.

17. The method of claim 14 further comprising:
providing the second clock signal to the second functional unit in response to receiving the hibernate signal.

18. The method of claim 14 further comprising: providing the first clock signal to the first functional unit to cause the first functional unit to convert analog frame information from a photo array to digital frame information and provide the digital frame information to the second functional unit; and providing the first clock signal to the second functional unit in response to receiving the first control signal to cause the second functional unit to process the digital frame information.

19. A wireless mouse comprising:
a navigation sensor comprising:
- a photo array; an analog-to-digital converter coupled to the photo array; a processor coupled to the analog-to-digital converter; and
- a clock control circuit coupled to the analog-to-digital converter and the processor; and a wireless transceiver coupled to the navigation sensor; wherein the clock control circuit is configured to provide a first clock signal having a first frequency to the analog-to-digital converter in response to receiving a start signal to cause the analog-to-digital converter to convert analog frame information from the photo array to digital frame information and provide the digital frame information to the processor, wherein the clock control circuit is configured to provide the first clock signal to the processor in response to receiving a first control signal from the analog-to-digital converter to cause the processor to generate position information using the digital frame information and provide the position information to the wireless transceiver, wherein the clock control circuit is configured to stop providing the first clock signal to the analog-to-digital converter in response to receiving the first control signal from the analog-to-digital converter, and wherein the wireless transceiver is configured to transmit the position information; and a control circuit configured to provide a hibernate signal to the clock control circuit.

20. The wireless mouse of claim 19 wherein the clock control circuit is configured to stop providing the first clock signal to the processor in response to receiving the second control signal from the processor, wherein the clock control circuit is configured to provide a second clock signal having a second frequency to the processor in response to receiving the hibernate signal, and wherein the first frequency is greater than the second frequency.

21. The wireless mouse of claim 19 wherein the navigation sensor further comprises a motion register coupled to the processor, and wherein the processor is configured to store the position information in the motion register.

* * * * *